United States Patent
Neumann

(10) Patent No.: US 9,260,010 B2
(45) Date of Patent: Feb. 16, 2016

(54) POWER TAKE-OFF SYSTEM

(71) Applicant: DEERE & COMPANY, Moline, IL (US)

(72) Inventor: Clayton P. Neumann, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 64 days.

(21) Appl. No.: 14/308,372

(22) Filed: Jun. 18, 2014

(65) Prior Publication Data

US 2015/0367728 A1    Dec. 24, 2015

(51) Int. Cl.
| | |
|---|---|
| F16D 21/02 | (2006.01) |
| B60K 17/28 | (2006.01) |
| B60K 25/06 | (2006.01) |
| B60K 25/02 | (2006.01) |
| F16D 11/14 | (2006.01) |

(52) U.S. Cl.
CPC .............. *B60K 25/06* (2013.01); *B60K 17/28* (2013.01); *B60K 25/02* (2013.01); *F16D 11/14* (2013.01); *F16D 21/02* (2013.01); *B60K 2025/024* (2013.01)

(58) Field of Classification Search
CPC .. F16D 21/02; B60K 25/06; B60K 2025/024; B60K 17/28
USPC ............................. 180/53.5; 192/48.9, 48.91
See application file for complete search history.

(56) References Cited

U.S. PATENT DOCUMENTS

| | | | | |
|---|---|---|---|---|
| 2,764,247 A * | 9/1956 | Wiegman | ................ | F02D 29/00 180/292 |
| 2,860,717 A * | 11/1958 | Jedrzykowski | ........ | B60K 25/00 180/53.5 |
| 3,464,277 A * | 9/1969 | Longshore | .............. | F16H 3/001 74/15.4 |
| 4,271,942 A * | 6/1981 | Ballendux | .............. | B60K 17/28 192/48.91 |
| 4,287,778 A * | 9/1981 | Quick | .................... | B60K 17/28 192/48.614 |
| 5,658,087 A * | 8/1997 | Butkovich | ............. | B60K 17/28 403/2 |
| 5,667,330 A * | 9/1997 | Henkel | .................. | A01B 71/06 403/328 |
| 6,854,541 B2 * | 2/2005 | Matufuji | ................ | B60K 17/28 180/53.1 |
| 7,874,222 B2 * | 1/2011 | Steele | .................... | B60K 17/28 74/15.4 |
| 8,127,632 B2 * | 3/2012 | Buhrke | .................. | B60K 17/28 74/11 |
| 2010/0099533 A1 * | 4/2010 | Horsfall | ................. | B60K 17/28 475/146 |
| 2015/0251537 A1 * | 9/2015 | Ruokola | ................ | B60K 17/28 74/15.4 |

OTHER PUBLICATIONS

Kinze Manufacturing, Electric Drive, Copyright 2014.

* cited by examiner

*Primary Examiner* — Ruth Ilan
(74) *Attorney, Agent, or Firm* — Ingrassia, Fisher & Lorenz

(57) ABSTRACT

A power take-off system for a vehicle is disclosed, including an input shaft, an output shaft, and a countershaft. The output shaft includes an engagement interface for rotationally fixed engagement with one of various implement shafts. The implement shafts extend outside the vehicle when engaged with the output shaft. A clutch device is configured to engage with one or more of the input shaft, the output shaft and the countershaft. In a first engagement position, the clutch device may cause transmission of rotational power from the input shaft to the output shaft via the clutch device. In a second engagement position, the clutch device may cause transmission of rotational power from the input shaft to the output shaft via the clutch device and the countershaft. In this way, both speeds appropriate for mechanical power transmission and speeds appropriate for electrical power generation may be obtained.

19 Claims, 8 Drawing Sheets

POWER TAKE-OFF SYSTEM

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to power take-off drives, including use of multi-speed power take-off drives in electricity generation.

BACKGROUND OF THE DISCLOSURE

Various vehicles (as well as various fixed machinery) may utilize a power take-off interface, whereby power may be transmitted from a power source within the vehicle to an implement external to the vehicle. For example, various tractors and other work vehicles include a power take-off interface with which a power take-off stub shaft may be engaged in order to provide mechanical power to an external implement.

Various external implements may also be configured to utilize electrical power input rather than mechanical power input. For example, in the agricultural industry towed seeders may utilize electrical power to execute a variety of seeding operations.

SUMMARY OF THE DISCLOSURE

A multi-speed power take-off system is disclosed. The system includes a rotatable input shaft, a rotatable output shaft, and a rotatable countershaft, wherein the input shaft receives rotational power from a power source included in the vehicle, and the output shaft includes an engagement interface for rotationally fixed engagement with one or more of a removable power take-off stub shaft and an electric machine input shaft. The system includes a clutch device configured to engage with one or more of the input shaft, the output shaft and the countershaft. Engaging the power take-off stub shaft with the engagement interface causes the clutch device to be oriented in a first engagement position, whereby rotational power is transmitted from the input shaft to the output shaft via the clutch device but not via the countershaft. The output shaft and the power take-off stub shaft thereby rotate at a mechanical power take-off output speed. Engaging the electrical machine input shaft with the connection interface of the output shaft causes the clutch device to be oriented in a second engagement position, whereby rotational power is transmitted from the input shaft to the output shaft via the clutch device and the countershaft. The output shaft and the electric machine input shaft thereby rotate at an electrical power generation speed.

One or more of the following features may also be included in the disclosed power take-off system. For example, the system may include a first gear surrounding a portion of the input shaft and rotationally engaging the first input shaft, a second gear surrounding a portion of the output shaft and rotating around the second axis, and a third gear surrounding a portion of the countershaft and rotating around the third axis. The first and second axes may overlap, the first gear may transmit rotational power between the input shaft and the countershaft, and the second gear may be meshed with the third gear. In the first engagement position, the clutch device may engage the first gear but not the second gear. In the second engagement position the clutch device may engage the second gear but not the first gear.

The clutch device may include a shift collar having a sliding splined connection with the output shaft. The system may also include a biasing element, such as a biasing spring, engaged with the clutch device and providing a biasing force along the first axis. The shift collar may engage with an outer circumference of a portion of the second gear. The engagement interface of the output shaft may include a receptacle for rotational engagement with one of the power take-off shaft and the electric machine input shaft. The vehicle may include one or more mounting brackets for an electrical machine, the electrical machine including the electric machine input shaft. When the electrical machine is mounted to the one or more mounting brackets the electric machine input shaft may rotationally engage with the engagement interface of the output shaft. The system may include a shield. The shield may be external to the vehicle, at least in part, and surrounds, at least in part, the first axis. The shield may include one or more vents for cooling of the electrical machine.

According to another aspect of the disclosure, a multi-speed power take-off system includes: an input shaft rotating around a first axis; an output shaft rotating around a second axis and including an engagement interface for rotationally fixed engagement with one or more implement shafts, which extend outside the vehicle when engaged with the engagement portion; and a countershaft rotating around a third axis. The system also includes a clutch device configured to engage with one or more of the input shaft, the output shaft and the countershaft, and includes a biasing element providing a biasing force to the clutch device along the first axis. Engaging a first of the one or more implement shafts with the connection interface of the output shaft causes, at least in part, the clutch device to be oriented in a first engagement position, whereby rotational power is transmitted from the input shaft to the output shaft via the clutch device but not via the countershaft. The output shaft and the first implement shaft thereby rotate at a first output speed. With a second of the one or more implement shafts engaged with the connection interface of the output shaft, and with the clutch device oriented in a second engagement position, rotational power may be transmitted from the input shaft to the output shaft via the clutch device and the countershaft. The output shaft and the second implement shaft thereby rotate at a second output speed not equal to first output speed.

One or more of the following features may also be included. For example, the system may include a first gear surrounding a portion of the input shaft and rotating around the first axis, a second gear surrounding a portion of the output shaft and rotating around the second axis, and a third gear surrounding a portion of the countershaft and rotating around the third axis. The first axis and the second axis may be axially aligned. The first gear may transmit rotational power between the input shaft and the countershaft. The second gear may be meshed with the third gear. In the first engagement position the clutch device may engage the first gear but not the second gear. In the second engagement position the clutch device may engage the second gear but not the first gear. The clutch device may be a shift collar having a sliding splined connection with the output shaft. In the first engagement position the shift collar may engage with an inner circumference of a portion of the first gear. In the second engagement position the shift collar may engage with an outer circumference of a portion of the second gear.

The rotationally fixed connection interface included in the output shaft may include a receptacle configured to rotationally engage with one of a power take-off shaft and an electric machine input shaft. The first output speed may be a mechanical power take-off output speed and the second output speed may be an electrical power generation speed. The system may include a biasing element engaged with the clutch device and providing a biasing force that may be co-axial with one or more of the first axis and the second axis. When the power take-off shaft is rotationally engaged in the receptacle of the output shaft the power take-off shaft causes, at least in part, the clutch device to engage with a first gear surrounding a portion of the input shaft. When the electric machine input shaft is rotationally engaged in the receptacle of the output shaft the biasing device may cause, at least in part, the clutch device to engage with a second gear surrounding a portion of the output shaft.

The vehicle may include one or more mounting brackets for an electrical machine, the second of the one or more implement shafts being an input shaft of the electrical machine. The input shaft to the electrical machine may rotationally engage with the connection interface of the output shaft when the electrical machine is mounted to the one or more mounting brackets. Engaging the input shaft to the electrical machine with the connection interface of the output shaft may cause, at least in part, the clutch device to be oriented in the second engagement position. The system may include a shield. The shield may surround, at least in part, the second axis be. The shield may include one or more vents for cooling of the electrical machine.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
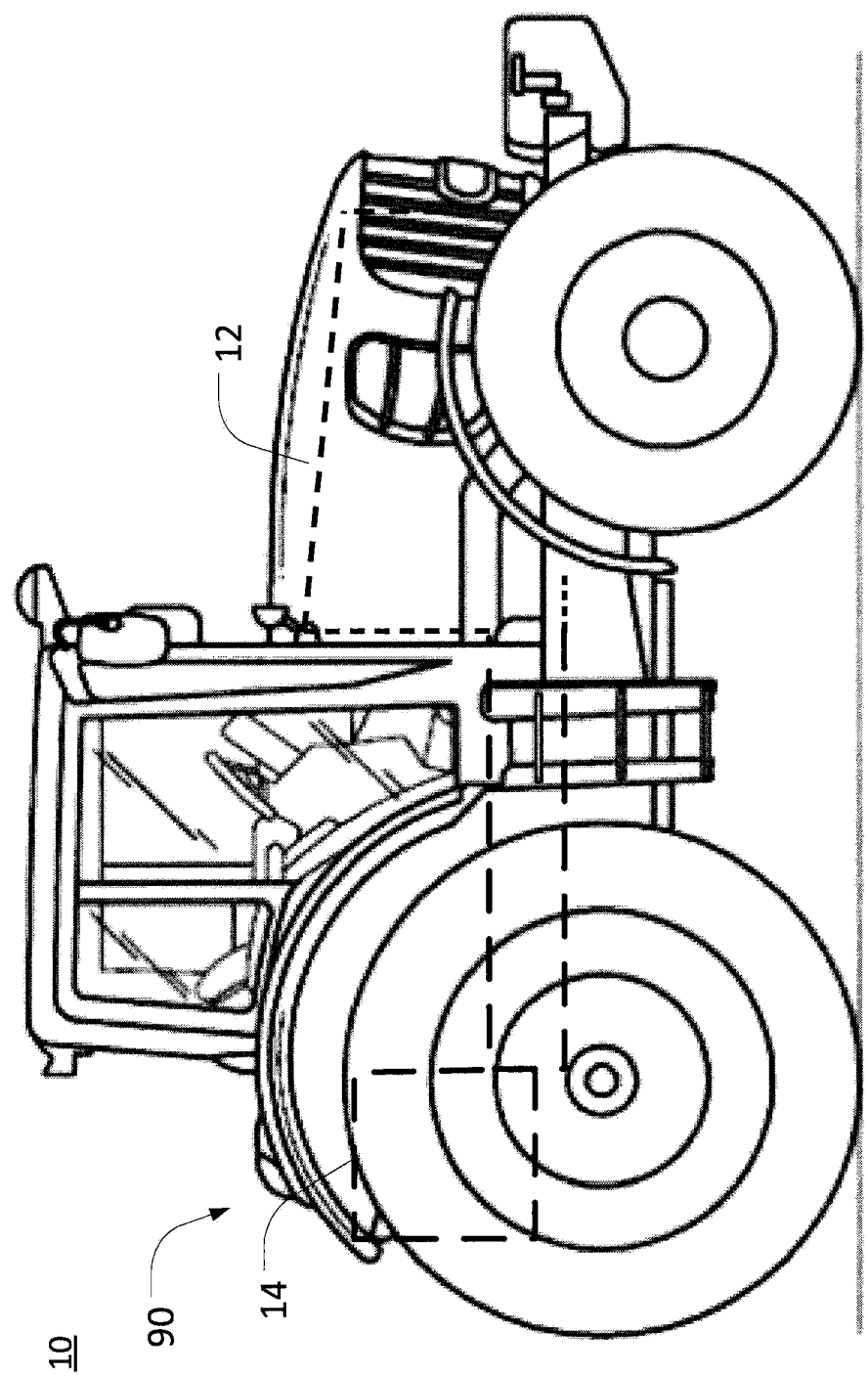
FIG. 1 is a side view of an example vehicle with respect to which a power take-off system as disclosed herein may be implemented.

The following describes one or more example embodiments of the disclosed power take-off system ("PTS"), as shown in the accompanying figures of the drawings described briefly above. Various modifications to the example embodiments may be contemplated by one of skill in the art.

As also noted above, various vehicles may include a power take-off ("PTO") interface, through which mechanical power from a vehicle engine may be transmitted to an external implement. In certain configurations, for example, a user may engage a PTO stub shaft with a PTO interface on a vehicle, which stub shaft may then be connected with various mechanical implements for provision of power to the implements from the vehicle engine.

Various external implements, however, may optimally utilize electrical power rather than mechanical power. Accordingly, a traditional PTO stub shaft and associated PTO interfaces and machinery may not directly provide the type of power required (i.e., electrical power). Further, standard rotational speeds required for mechanically-driven implements may be well below the rotational speed required for efficient electrical power generation. For example, typical PTO shafts rotate at speeds on the order of 1,000 RPM, whereas an electric generator often requires speeds that are many multiples higher. Accordingly, traditional PTO set-ups may not provide an appropriate rotational speed for electrically-driven implements. Additionally, the wide variability of configurations of trailer-mounted electrical generators (e.g., varied locations and orientations, varied voltage, current, or other electrical needs, and so on) may make it difficult to provide a generalized configuration for delivery of power to these generators from a PTO shaft and force the purchase or unique generators for each implement.

Various embodiments of the PTS disclosed herein may address these and other issues. For example, a PTS may allow users to utilize power from a PTO interface for lower speed mechanical applications as well as higher speed electrical generation, and may allow for rapid and easy transitions between these operating modes. Further, the PTS may allow for direct attachment of an electrical generator to a relevant vehicle (or other machinery), thereby facilitating fully portable and easily customizable electrical generation.

For example, the PTS may have a transmission included within a vehicle. The transmission may be configured to receive rotational power from the vehicle engine and output a rotational power with a variety of rotational speeds. Output speeds may depend on the path of power transmission through the transmission as well as various other factors. In certain embodiments, the particular output rotational speed may depend on what type of device is engaged with the output portion of the transmission. For example, if a traditional PTO stub shaft is engaged with the transmission, the transmission may provide a lower rotational speed output (e.g., 1,000 RPM). Likewise, if a shaft of an electrical generator is engaged with the transmission, the transmission may provide a higher rotational speed output (e.g., 8,000 RPM). Transition between these two (or other) modes may be implemented automatically, based upon the type of external shaft (e.g., a PTO stub shaft or an electrical generator input shaft) that is engaged with the transmission.

In certain embodiments, the PTS may include a first input shaft, an output shaft, and a countershaft. The input shaft and the output shaft may, for example, rotate on a single axis, with the countershaft rotating on an offset axis. The output shaft may include a connection interface (e.g., a splined receptacle connection) configured to rotationally engage with (i.e., convey rotational force to) a variety of external-implement shafts (e.g., PTO stub shafts and electrical generator input shafts). A clutch device, such as a shift collar, may be configured to engage with various components in order to determine the path of power transmission from the input shaft to the output shaft and, thereby, to a connected external-implement shaft. For example, a clutch device may be configured to engage with the input shaft, the output shaft, or the countershaft, either directly or via one or more gears connected to the shafts.

In certain embodiments, a biasing element, such as a biasing spring, may engage with the clutch device. In this way, for example, when a particular external-implement shaft is engaged with the output shaft the clutch device may provide a first path of power transmission (e.g., a lower speed path) and when that shaft is removed the clutch device may provide a second path of power transmission (e.g., a higher speed path).

As will become apparent from the discussion herein, the disclosed PTS may be used advantageously in a variety of settings and with a variety of work machines. For example, referring now to FIG. 1, work vehicle 10 (e.g., a tractor) is depicted having powertrain 12. In certain embodiments, vehicle 10 may include a PTO system for providing power via powertrain 12 to external implements. In certain embodiments, accordingly, vehicle 10 may include PTS 14. It should be note that although vehicle 10 is depicted as a particular tractor, it will be understood that a PTS may be implemented with respect to a variety of other platforms. For example, a PTS may be implemented with respect to other work vehicles, non-work vehicles, or various non-vehicle applications (e.g., fixed-location machinery). Further, although PTS 14 is depicted as located at the rear of vehicle 10, other configurations and mounting locations may be possible. It will also be understood, in light of the discussion herein, that a PTS may be implemented as a retrofit of existing vehicles (or other machinery) or as a feature of new vehicles (or machinery).

Figure 2:
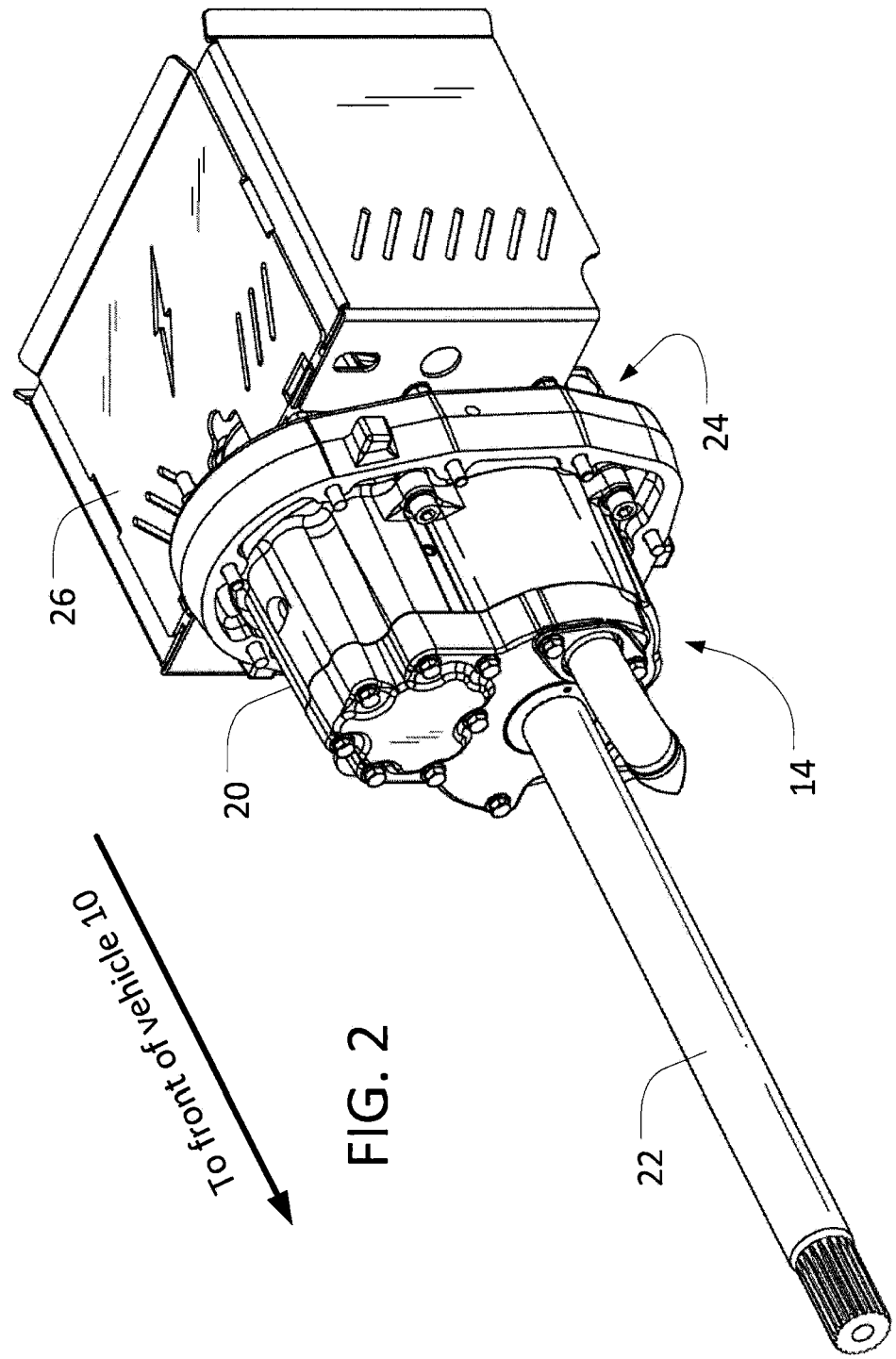
FIG. 2 is a perspective view of an example multi-speed power take-off system included in the vehicle of FIG. 1.

Referring also to FIG. 2, a view of one embodiment of PTS 14 is presented. PTS 14 may, for example, include housing 20, which may be generally contained within vehicle 10. In certain configurations, housing 20 may be designed to occupy the same (or similar) space as an existing PTO device, so as to facilitate easier manufacturing or retrofitting of vehicles to include PTS 14.

Input shaft 22 may extend into housing 20 to provide power to PTS 14 (e.g., from engine 12). As also noted above, in certain embodiments PTS 14 may be located at the rear of vehicle 10. For example, in certain embodiments rear face 24 of housing 20 may be flush with (or otherwise near) a rear panel of vehicle 10. In certain embodiments, external housing 26 may extend from PTS 14 outside of vehicle 10. External housing 26, for example, may provide an additional shield partially encasing an output interface of PTS 14 (not shown in FIG. 2).

Figure 3:
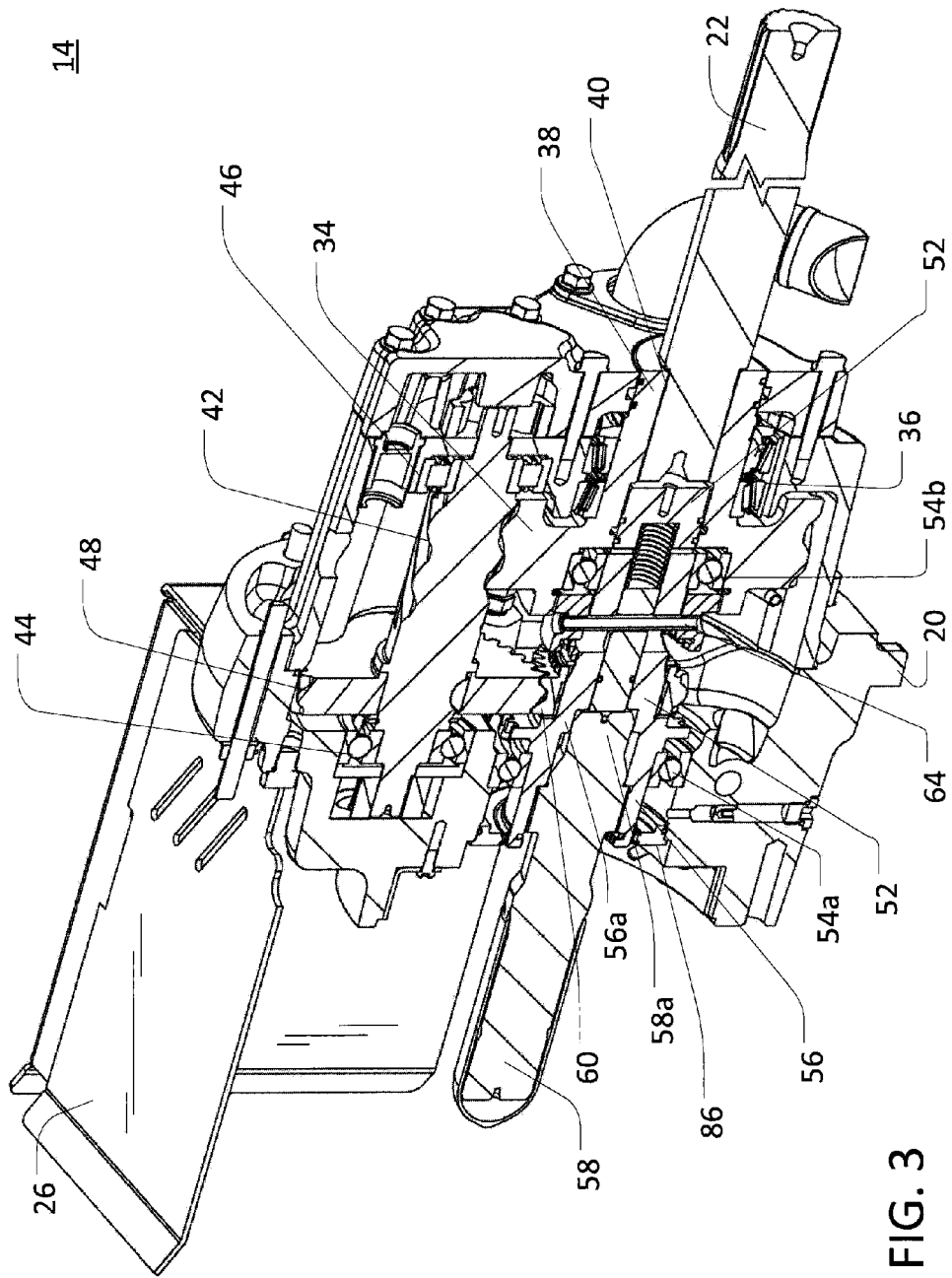
FIG. 3 is a perspective sectional view of the multi-speed power take-off system of FIG. 2.
Figure 4:
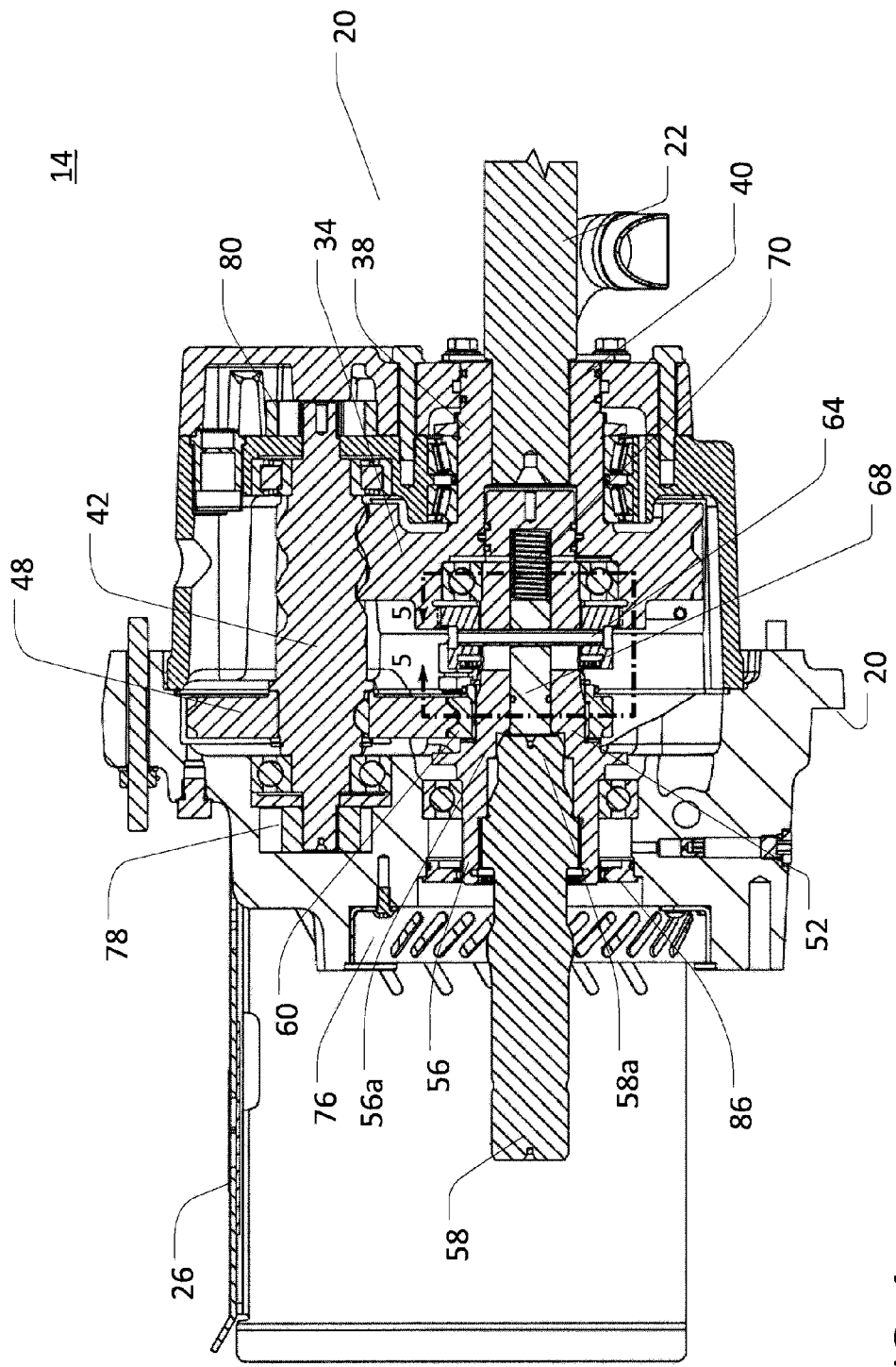
FIG. 4 is a side sectional view of the multi-speed power take-off system of FIG. 2 with a first power take-off shaft engaged.

Referring also to FIGS. 3 and 4, PTS 14 may include input gear 34, which may be supported by tapered bearings 36 located along hub 38 of input gear 34. Input shaft 22 may be rotationally engaged with input gear 34. For example, input shaft 22 and input gear 34 may be connected via splined connection 40 along hub 38. Accordingly, input gear 34 may rotate at the same speed as input shaft 22 (e.g., ~1,000 RPM).

Input gear 34 may be configured to transmit rotational power from shaft 22 to countershaft 42, which may be supported by bearings 44 and 46. For example, a countershaft input gear may be rotationally engaged with countershaft 42 (e.g., via a splined connection) and also meshed with input gear 34. In certain embodiments (e.g., as depicted in FIG. 3), input gear 34 may engage directly with countershaft 42. If input gear 34 has a larger effective diameter than countershaft 42 (or an intervening countershaft gear), this may result in an increase in rotational speed as rotational power is transmitted from input shaft 22 via input gear 34 to countershaft 42 (e.g., causing countershaft 42 to rotate at ~4,000 RPM). It will be understood, however, that other configurations may be possible.

Outboard countershaft gear 48 may be rotationally engaged with countershaft 42. In certain embodiments, countershaft gear 48 may engage with countershaft 42 via a splined connection or various other means. In certain embodiments, countershaft gear 48 may be integrally formed with countershaft 42.

PTS 14 may further include output shaft 52, which may be supported, for example, by bearings 54a and 54b. In certain embodiments, output shaft 52 may have an engagement interface in the form of cup-shaped receptacle interface 56. In certain embodiments, interface 56 may include a splined internal circumference, which may engage with splines on an external circumference of PTO stub shafts 58 (or another removable external-implement shaft). In this way, for example, rotational power may be transmitted from output shaft 52 to stub shaft 58. In certain embodiments, PTO stub shaft 58 may include a reduced diameter inner end 58a, which may be configured to fit within reduced diameter portion 56a of interface 56 to properly pilot the stub shaft 58.

In certain embodiments, output gear 60 may surround a portion of output shaft 52 and may be meshed with countershaft gear 48. For example, output gear 60 may generally rotate freely around shaft 52 (e.g., on a journal bearing between the components). In the embodiment depicted, output gear 60 may have a smaller diameter than countershaft gear 48. Accordingly, when rotational power is transmitted from countershaft gear 48 to output gear 60, output gear 60 may rotate at a faster speed than countershaft gear 48. For example, with an rotational speed at input shaft 22 of approximately 1,000 RPM, output gear 60 may have a rotational speed of approximately 8,000 RPM.

Figure 5:
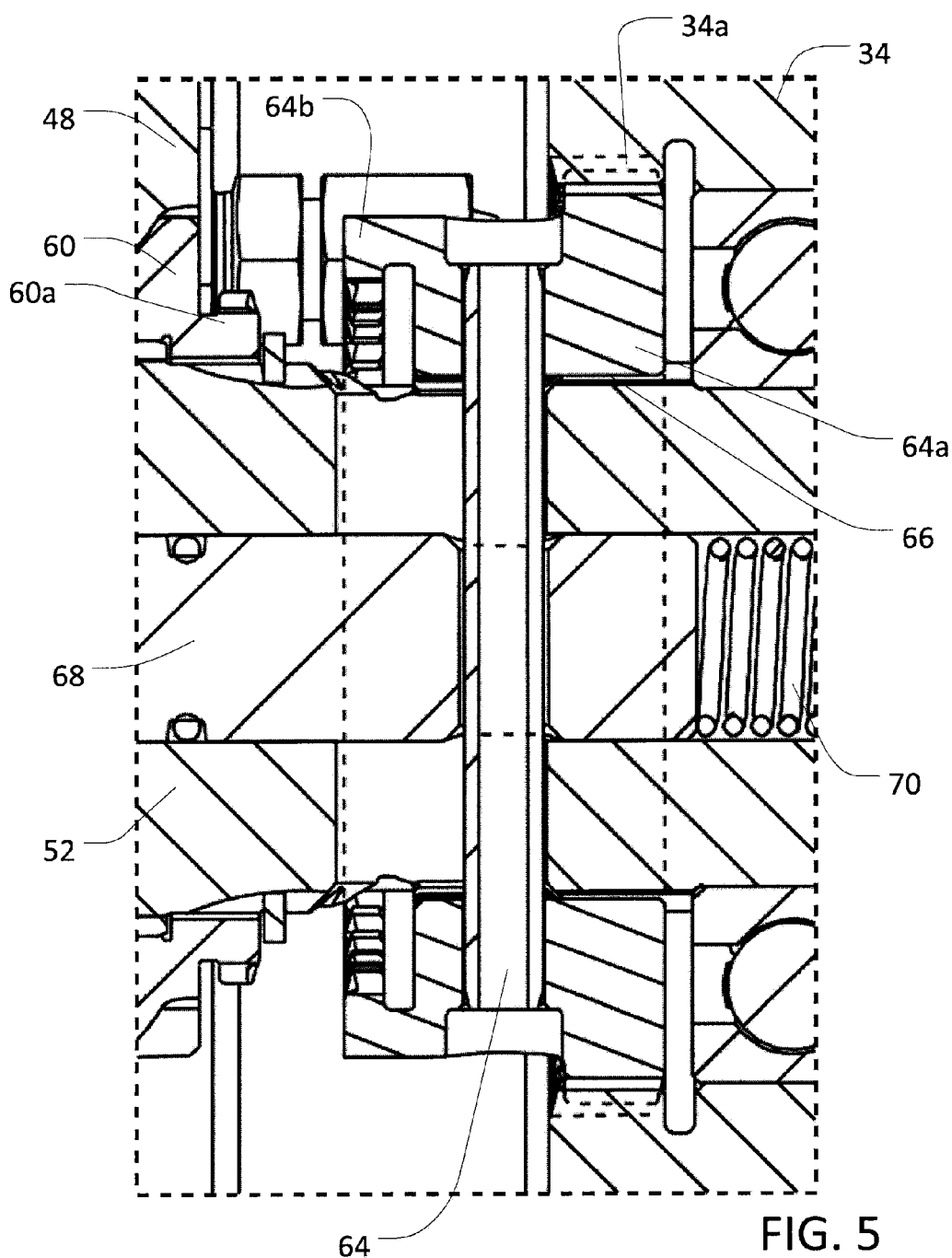
FIG. 5 is an enlarged sectional view of area 5-5 of FIG. 4.

Referring also to FIG. 5, an enlarged view of area 5-5 of FIG. 4 is depicted. As also noted above, PTS 14 may include a clutch device configured to alter the path of power transmission through PTS 14 and thereby change the rotational speed of output shaft 52 relative to input shaft 22. In certain embodiments, PTS 14 may include shift collar 64, which may be rotationally fixed but axially movable with respect to output shaft 52. For example, PTS 14 may include splined connection 66 between shift collar 64 and output shaft 52, along which shift collar 64 may slide. Accordingly, shift collar 64 may move between various engagement positions to transmit rotational power to output shaft 52.

Shift collar 64, input gear 34 and output gear 60 may include various features allowing rotational engagement of shift collar 64 with either of input gear 34 and output gear 60. For example, shift collar 64 may include a splined interface along the outer circumference of extension 64a and a splined interface along the inner circumference of extension 64b. Likewise, input gear 34 may include a splined interface along the inner circumference of extension 34a and output gear 60 may include a splined interface along the outer circumference of extension 60a. It may be useful, for manufacturing purposes, to configure the various splined interfaces of shift collar 64 and gears 34 and 60 as described above. For example, it may be easier to manufacture output gear 60 with a splined interface along an outer circumference of extension 60a rather than an inner circumference. It will be understood, however, that various other configurations may be possible for controlling the transmission of power from either of gears 34 and 60, via a clutch device, to output shaft 52.

As depicted in FIGS. 3 and 4 and in the enlarged view in FIG. 5, when shift collar 64 is slid inboard within the vehicle (i.e., to the right, from the perspective of FIGS. 3-5) the splined interfaces on extensions 64a and 34a may be engaged, thereby allowing rotational power to be transmitted from input gear 34 to shift collar 64 (via extensions 34a and 64a) and from shift collar 64 to output shaft 52 (via splined connection 66). Likewise, when shift collar 64 is slid outboard within the vehicle (i.e., to the left in FIGS. 3-5), the splined interfaces on extensions 64b and 60a may be engaged, thereby allowing rotational power to be transmitted from output gear 60 to shift collar 64 (via extensions 60a and 64b) and from shift collar 64 to output shaft 52 (via splined connection 66). When shift collar 64 is slid inboard to engage input gear 34 (as in FIGS. 3-5) output shaft 52 may rotate with a lower rotational speed (e.g., a rotational speed equal to that of input shaft 22). This may be useful, for example, if stub shaft 58 is to provide rotational power to external mechanical implements. In contrast, when shift collar 64 is slid outboard to engage gear 60 (as in FIGS. 6 and 7) output shaft 52 may rotate with a higher rotational speed (i.e., the rotational speed of input shaft 22 multiplied by the gear ratio of the power transmission path through countershaft 42). This may be useful, for example, if PTS 14 is to provide rotational power output for generation of electrical power by an external implement.

In certain embodiments, the particular power transmission path utilized by PTS 14 may be influenced by a biasing element associated with the relevant clutch device. For example, piston 68 may extend from reduced diameter portion 56a of interface 56 through an internal portion of output shaft 52 to spring 70. Spring 70 may also be configured to reside within an internal portion of output shaft 52. As depicted in FIGS. 3-7, spring 70 may bias shift collar 64 to in an outboard direction, so that the default transmission path through PTS 14 may pass through countershaft 42, and the default output speed at output shaft 52 may correspondingly be greater than the speed of input shaft 22. When piston 68 is depressed, however, this may compress spring 70 thereby sliding shift collar 64 inboard. This may result in power being transmitted directly to output shaft 52 from input shaft 22 (via shift collar 64), with output shaft 52 and input shaft 22 spinning at the same rotational speed. In this light, stub shaft 58 may be usefully configured such that reduced diameter portion 58a fits into reduced diameter portion 56a of receptacle interface 56. Accordingly, insertion of stub shaft 58 into receptacle interface 56 may result in spring 70 being compressed and shift collar 64 engaging input gear 34 (rather than output gear 60).

Figure 6:
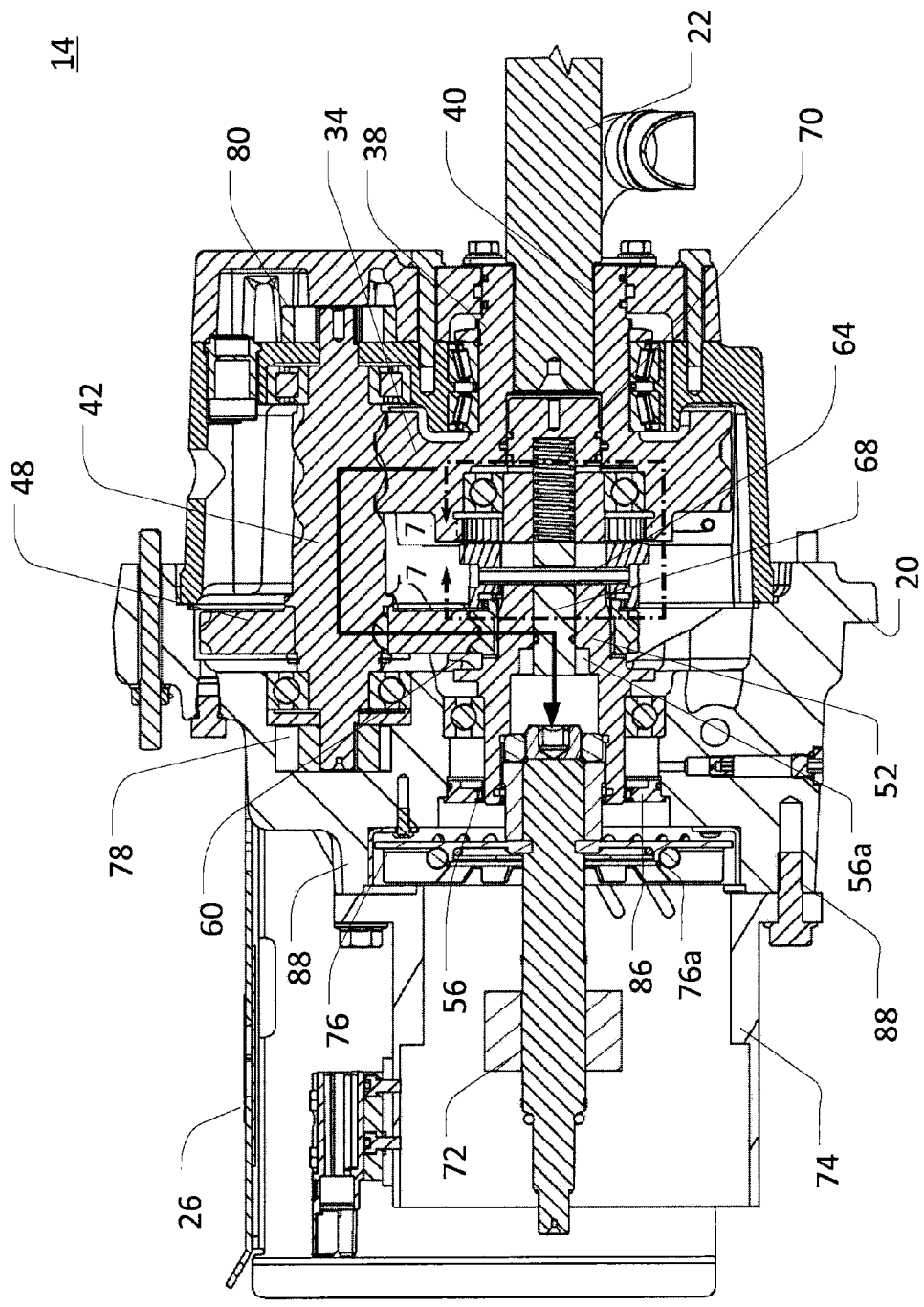
FIG. 6 is a sectional view of the multi-speed power take-off system of FIG. 2 with an example electric machine engaged.
Figure 7:
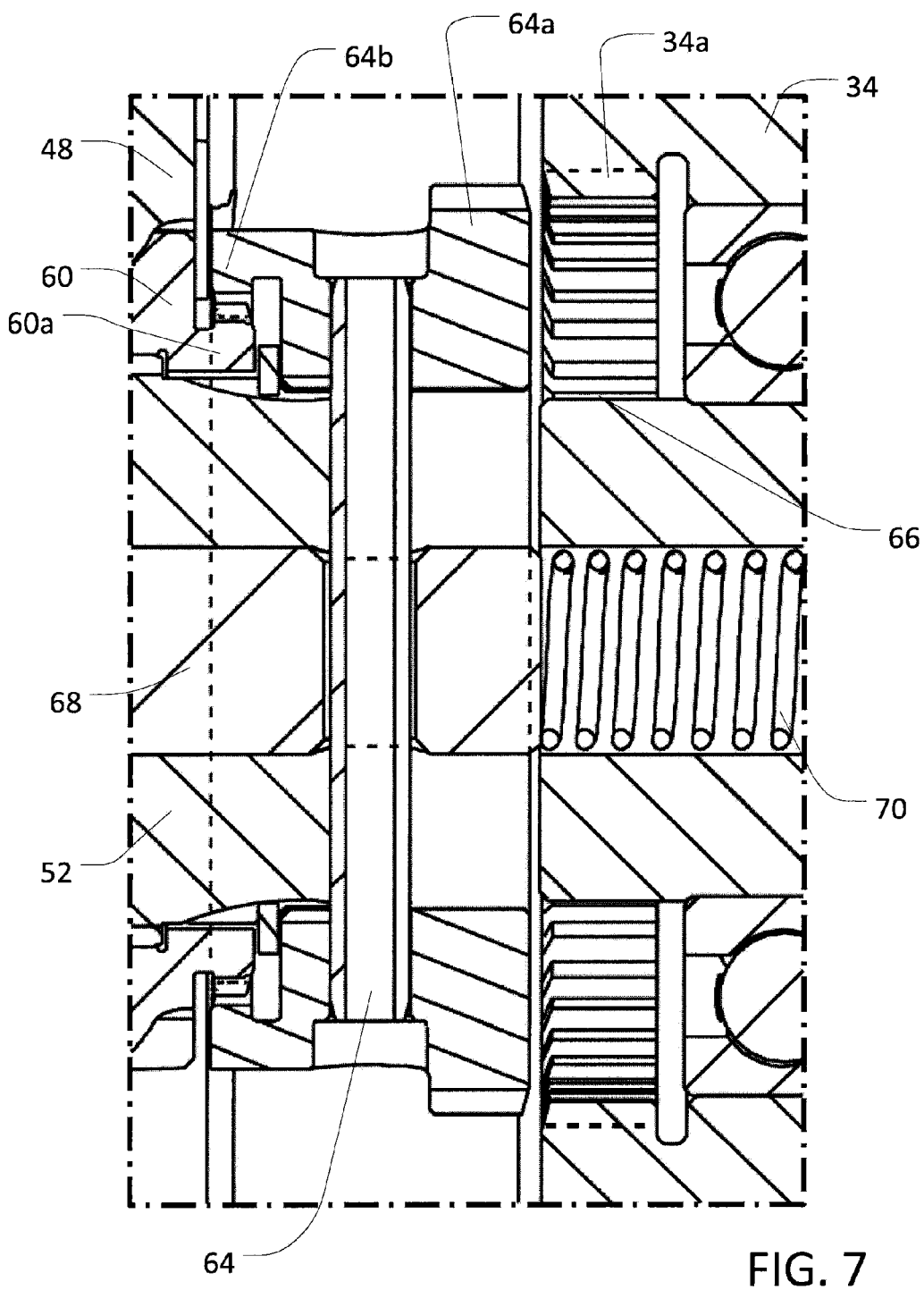
FIG. 7 is an enlarged sectional view of area 7-7 of FIG. 6.

Referring also to FIGS. 6 and 7, it may be useful to configure different implement shafts so that they do not fit into the reduced diameter portion 56a of interface 56. In this way, when a different implement shaft is engaged with output shaft 52 (i.e., seated in receptacle interface 56), shift collar 64 may slide outboard to engage with output gear 60 and power may be transmitted from input shaft 22 to the implement shaft via countershaft 42. For example, input shaft 72 of electrical machine 74 may be configured so as not to depress piston 68 when inserted into receptacle interface 56. In certain embodiments, for example, shaft 72 may include an outer diameter at the inboard end that does not fit within reduced diameter portion 56a and accordingly cannot depress piston 68 in order to compress spring 70. Alternatively, for example, input shaft 72 may be configured to be too short to depress rod 68 (or otherwise configured to prevent depression of piston 68). For example, as depicted in FIG. 6, when electrical machine 74 is flush against housing 20 (or a rear surface of vehicle 10) input shaft 72 may be too short to depress piston 68. Accordingly, spring 70 may cause shift collar 64 to slide outboard to engage output gear 60. Rotational power may then be transmitted from input shaft 22 via countershaft 42 to shaft 72, with corresponding increase in rotational speed above the speed of input shaft 22. As also noted above, this may provide the higher rotational speed desired for generation of electricity with electrical machine 74.

In certain embodiments, an electrical machine shield may be provide as part of PTS 14. For example, cylindrical shield 76, with various air gaps 76a may be attached to (or integrally formed with) housing 20. This shield may, for example, protect against objects coming into contact with the rotating fan (not shown), while also providing for appropriate air circulation for the cooling of electrical machine 74.

Still referring to FIG. 6, in various embodiments PTS 14 may include various lubrication devices. For example, PTS 14 may include a scavenge pump (e.g., pump 78) to return lubrication fluid from within PTS 14 to a separate sump or fluid reservoir. Likewise, PTS 14 may include a lubrication pump (e.g., pump 80) to distribute lubrication fluid from a sump or reservoir to various components within PTS 14. Further, various internal channels may be provided for the appropriate distribution of lubrication fluid within PTS 14.

Other components may also be included. For example, due to the potentially high rotational speed of output shaft 52, high speed lip seal 86 may be included between housing 20 and output shaft 52 at the interface between PTS 14 and the environment. In certain embodiments, particular mounting brackets may be provided to vehicle 10 in order to facilitate appropriate connection of an electrical machine (e.g., electrical machine 74) or other external implement to PTS 14. Mounting brackets 88 may be configured such that when brackets 88 are utilized to attach an electrical machine (e.g., electrical machine 74) to PTS 14, an input shaft of the electrical machine is appropriately seated in engagement interface 56.

Figure 9:
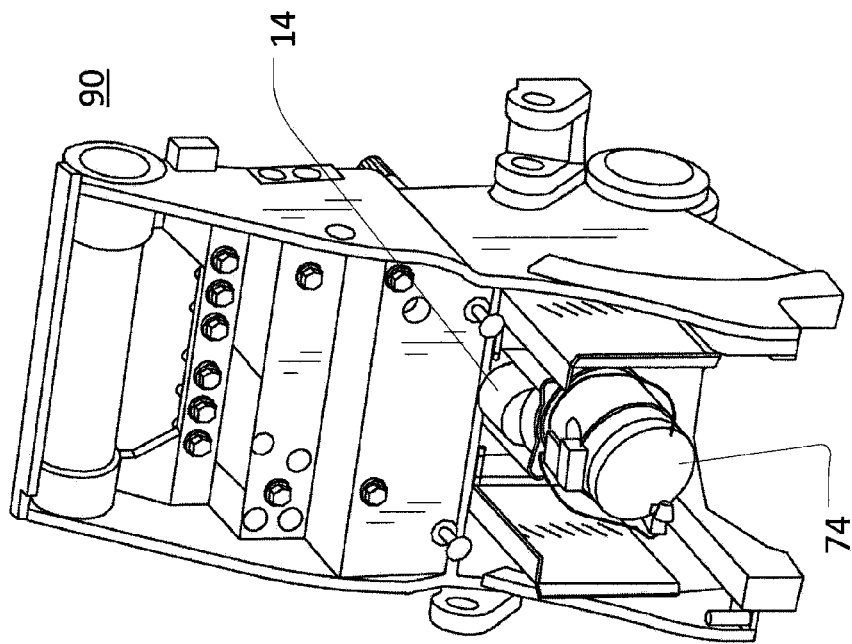
FIG. 9 is a perspective view of a back portion of the vehicle of FIG. 1, with the electric machine engaged, as in FIG. 6.
Figure 8:
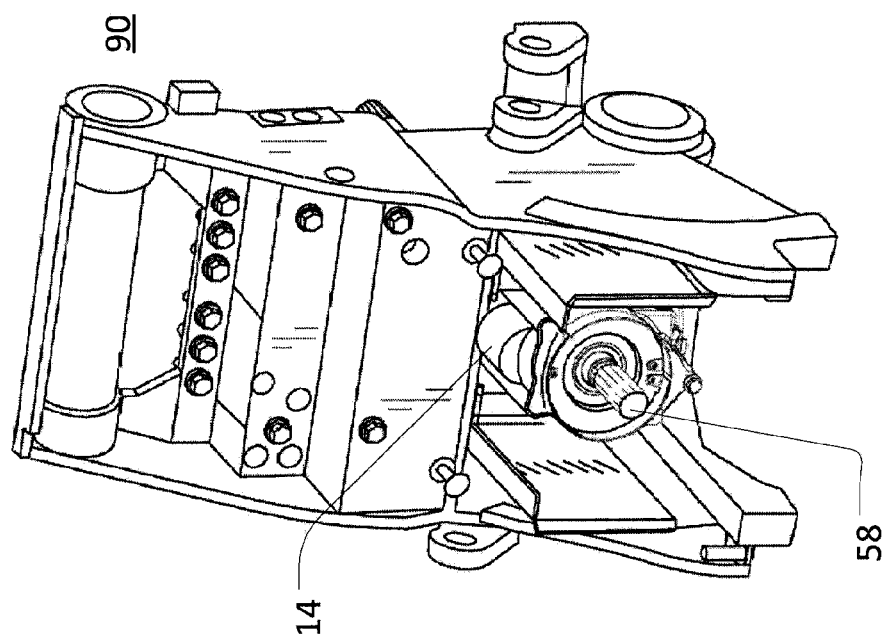
FIG. 8 is a perspective view of a back portion of the vehicle of FIG. 1, with the example power take-off shaft engaged, as in FIG. 4.

Referring also to FIGS. 8 and 9, a view of the rear of vehicle 10 is presented, with a shield removed to better show the location of PTS 14. It can be seen that PTS 14 may allow for easy configuration of vehicle 10 to provide for either mechanical output (e.g., at a lower rotational speed) or electrical generation (e.g., at a higher rotational speed) at its PTO output. For example, in FIG. 9, it can be seen that electrical machine 74 has been mounted (e.g., via brackets 88 (not shown in FIG. 9)) to back portion 90 of vehicle 10. Accordingly, shaft 72 may extend into receptacle interface 56 and shift collar 64 may provide a power transmission path from input shaft 22 via countershaft 42 to shaft 72 (as also depicted in FIGS. 6 and 7). Thus, shaft 72 may rotate at an appropriately high speed for operation of electrical machine 74, allowing electrical machine 74 to usefully generate electrical power. Likewise, in FIG. 8, it can be seen that electrical machine 74 has been disconnected and stub shaft 58 has been inserted into receptacle interface 56. Accordingly, shift collar 64 may provide a power transmission path directly from input shaft 22 to shaft 58, bypassing countershaft 42 (as also depicted in FIGS. 3-5). Thus, shaft 58 may rotate at an appropriate speed for operation of various mechanical implements.

It will be appreciated, in light of FIGS. 8 and 9, that PTS 14 may accordingly be implemented without requiring modification of back portion 90 of vehicle 10. This may, for example, allow simple changes to manufacturing processes and plans in order to incorporate PTS 14 into new vehicles, as well as easy retrofitting of existing vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A multi-speed power take-off system for a vehicle, the power take-off system comprising:
   an input shaft rotating around a first axis and receiving rotational power from a power source included in the vehicle;
   an output shaft rotating around a second axis and including an engagement interface for rotationally fixed engagement with one or more implement shafts, the one or more implement shafts extending outside the vehicle when engaged with the engagement interface;
   a countershaft rotating around a third axis; and
   a clutch device configured to engage with one or more of the input shaft, the output shaft and the countershaft;
   wherein engaging a first of the one or more implement shafts with the engagement interface of the output shaft causes, at least in part, the clutch device to be oriented in a first engagement position, whereby rotational power is transmitted from the input shaft to the output shaft via the clutch device but not via the countershaft, the output shaft and the first implement shaft thereby rotating at a first output speed;
   wherein engaging a second of the one or more implement shafts with the engagement interface of the output shaft causes, at least in part, the clutch device to be oriented in a second engagement position, whereby rotational power is transmitted from the input shaft to the output shaft via the clutch device and the countershaft, the output shaft and the second implement shaft thereby rotating at a second output speed not equal to first output speed;
   wherein a first of the one or more implement shafts is a removable power take-off stub shaft for providing mechanical power to a mechanical implement external to the vehicle and the first output speed is a mechanical power take-off output speed; and
   wherein a second of the one or more implement shafts is a input shaft to an electrical machine external to the vehicle and the second output speed is an electrical power generation speed.

2. The power take-off system of claim 1, further comprising:
   a first gear surrounding a portion of the input shaft and rotating around the first axis;
   a second gear surrounding a portion of the output shaft and rotating around the second axis; and
   a third gear surrounding a portion of the countershaft and rotating around the third axis.

3. The power take-off system of claim 2, wherein the first axis and the second axis are axially aligned;
   wherein the first gear transmits rotational power between the input shaft and the countershaft; and
   wherein the second gear is meshed with the third gear.

4. The power take-off system of claim 3, wherein in the first engagement position the clutch device engages the first gear but not the second gear.

5. The power take-off system of claim 3, wherein in the second engagement position the clutch device engages the second gear but not the first gear.

6. The power take-off system of claim 3, wherein the clutch device includes a shift collar having a sliding splined connection with the output shaft; and
   wherein in the first engagement position the shift collar engages with an inner circumference of a portion of the first gear.

7. The power take-off system of claim 3, wherein the clutch device includes a shift collar having a sliding splined connection with the output shaft; and
   wherein in the second engagement position the shift collar engages with an outer circumference of a portion of the second gear.

8. The power take-off system of claim 1, wherein the rotationally fixed engagement interface included in the output shaft includes a receptacle configured to rotationally engage with the one or more implement shafts.

9. The power take-off system of claim 8, further comprising:
   a biasing element engaged with the clutch device and providing a biasing force that is co-axial with one or more of the first axis and the second axis.

10. The power take-off system of claim 9, wherein when the power take-off stub shaft is rotationally engaged in the receptacle of the output shaft the power take-off stub shaft causes, at least in part, the clutch device to engage with a first gear surrounding a portion of the input shaft; and
    wherein when the power take-off shaft is removed from the receptacle the output shaft biasing element causes, at least in part, the clutch device to engage with a second gear surrounding a portion of the output shaft.

11. The power take-off system of claim 1, wherein the vehicle includes one or more mounting brackets for the electrical machine; and
    wherein the input shaft to the electrical machine rotationally engages with the engagement interface of the output shaft when the electrical machine is mounted to the one or more mounting brackets.

12. The power-take-off system of claim 1, further including a shield that is, at least in part, external to the vehicle and surrounds, at least in part, the second axis, wherein the shield includes one or more vents for cooling of the electrical machine.

13. A multi-speed power take-off system for a vehicle, the power take-off system comprising:
    an input shaft and an output shaft, wherein the input shaft and the output shaft rotate around a first axis, the input shaft receives rotational power from a power source included in the vehicle, and the output shaft includes an engagement interface for rotationally fixed engagement with one or more of a removable power take-off shaft and an electric machine input shaft;
    a first gear surrounding a portion of the input shaft and rotationally engaging the first input shaft;

a second gear surrounding a portion of the output shaft and rotating around a second axis;

a clutch device configured to selectively engage with one of the first gear and the second gear;

a biasing element providing a biasing force to the clutch device along the first axis; and a countershaft rotationally engaged with the first gear and a third gear, the third gear being rotationally engaged with the second gear;

wherein, when the removable power take-off shaft is engaged with the engagement interface, the biasing element causes, at least in part, the clutch device to engage with the first gear, whereby rotational power is transmitted from the input shaft to both of the output shaft and the removable power take-off shaft via the first gear and the clutch device, but not via the countershaft, the output shaft and the removable power take-off shaft thereby rotating at a first output speed; and wherein, when the electric machine input shaft is engaged with the engagement interface, the biasing element causes, at least in part, the clutch device to engage with the second gear, whereby rotational power is transmitted from the input shaft to both of the output shaft and the electric machine input shaft via the first gear, the countershaft, the third gear, the clutch device, and the second gear, the output shaft and the electric machine input shaft thereby rotating at a second output speed different from the first output speed.

14. The power take-off system of claim 13, wherein the clutch device includes a shift collar having a sliding splined connection with the output shaft; and wherein the biasing element includes a biasing spring.

15. The power take-off system of claim 14, wherein the shift collar engages with an outer circumference of a portion of the second gear.

16. The power take-off system of claim 14, wherein the shift collar engages with an inner circumference of a portion of the first gear.

17. The power take-off system of claim 13, wherein the engagement interface of the output shaft includes a receptacle for rotational engagement with one of the power take-off shaft and the electric machine input shaft.

18. The power take-off system of claim 13, wherein the vehicle includes one or more mounting brackets for an electrical machine, the electrical machine including the electric machine input shaft; and wherein when the electrical machine is mounted to the one or more mounting brackets the electric machine input shaft rotationally engages with the engagement interface of the output shaft.

19. The power take-off system of claim 18, further including a shield that is, at least in part, external to the vehicle, and surrounds, at least in part, the first axis, wherein the shield includes one or more vents for cooling of the electrical machine.

* * * * *